United States Patent [19]

Matsuzawa et al.

[11] 4,135,045

[45] Jan. 16, 1979

[54] PROCESS FOR POLYMERIZATION OF OLEFINS AND CATALYST COMPOSITION THEREFOR

[75] Inventors: Norio Matsuzawa, Ohtake; Hidesaburo Oi, Waki; Hiroshi Nishimura; Shigeru Wada, both of Ohtake; Juntaro Sasaki, Iwakuni, all of Japan

[73] Assignee: Mitsui Petrochemical Industries, Ltd., Tokyo, Japan

[21] Appl. No.: 719,440

[22] Filed: Sep. 1, 1976

Related U.S. Application Data

[63] Continuation of Ser. No. 185,378, Sep. 30, 1971, Pat. No. 4,048,415.

[30] Foreign Application Priority Data

Oct. 2, 1970 [JP] Japan ............................ 45-85930

[51] Int. Cl.$^2$ .......................... C08F 4/66; C08F 10/06
[52] U.S. Cl. ........................... 526/114; 252/429 B; 252/429 C; 526/128; 526/139; 526/141; 526/142; 526/158; 526/159; 526/351
[58] Field of Search ................ 252/429 B, 429 C; 526/139, 141, 142, 158, 159, 114, 128

[56] References Cited

U.S. PATENT DOCUMENTS

| | | | |
|---|---|---|---|
| 3,269,996 | 8/1966 | Langer | 526/139 |
| 3,514,434 | 5/1970 | Fodor | 526/139 |

FOREIGN PATENT DOCUMENTS

1001820  8/1965  United Kingdom.

*Primary Examiner*—Edward J. Smith
*Attorney, Agent, or Firm*—Sherman & Shalloway

[57] ABSTRACT

An improved process for the polymerization of olefins in the presence of catalyst consisting essentially of:

(A) a titanium trichloride composition obtained by micro-pulverizing a titanium trichloride component prepared by reduction of titanium tetrachloride with a member selected from the group consisting of hydrogen, silicon, metallic titanium and metallic aluminum, in the presence of a complex of aluminum chloride or aluminum bromide with an electron-donor selected from the group consisting of oxygen-containing organic compounds, nitrogen-containing organic compounds and phosphorus-containing organic compounds, the amount of the complex being 0.005 to 0.5 mole per mole of the titanium trichloride component, and extracting the micro-pulverized titanium trichloride component with a solvent selected from the group consisting of saturated aliphatic hydrocarbons, aromatic hydrocarbons and halogenated aromatic hydrocarbons; and (B) an organoaluminum compound, and the catalyst therefor.

27 Claims, No Drawings

PROCESS FOR POLYMERIZATION OF OLEFINS AND CATALYST COMPOSITION THEREFOR

This is a continuation of application Ser. No. 185,378, filed Sept. 30, 1971 now U.S. Pat. No. 4,048,415.

This invention relates to an improved catalyst composition which exhibits sufficiently high polymerizing activity in the polymerization or copolymerization of alpha-olefins to form stereospecific polymers, and to an improved process for polymerizing or copolymerizing olefins in the presence of such improved catalyst composition.

Ziegler-type catalyst compositions comprising in combination an organometallic compound and a solid transition metal compound of a lower valency, and particularly, catalyst systems containing a titanium trichloride composition as the solid transition metal compound of a lower valency are used broadly.

As such titanium trichloride composition, products obtained by reducing titanium tetrachloride with metallic aluminum and activating the same by the usual dry micro-pulverization means with use of a ball mill or vibratory mill are most broadly used industrially. However, when stereospecific polymerization is conducted with use of a catalyst system comprising a combination of such titanium trichloride component with an organometallic compound, fully sufficient polymerization activity cannot be obtained and the crystallinity of the resulting polymer (isotacity indicated by "portion insoluble in boiling heptane") is not yet sufficient.

In the case of a titanium trichloride component free of other components than titanium and halogen, prepared by reduction of titanium tetrachloride with hydrogen or metallic titanium, it is reported that the polymerization activity can be increased by pulverizing such titanium trichloride component in the co-presence of a metal chloride such as aluminum chloride to form a solid solution thereof (see the specification of U.S. Pat. No. 3,130,003 and the specification of German Pat. No. 1,269,101). However, these catalyst compositions do not give fully sufficient activity for polymerizing olefins and the contents of crystalline polymers in the resulting olefin polymers are not fully sufficient.

With a view to developing a catalyst system free of these defects inherent to the titanium trichloride component, research has been conducted and it has now been found that a catalyst consisting essentially of (A) a titanium trichloride composition obtained by micro-pulverizing a titanium trichloride component prepared by reduction of titanium tetrachloride with a member selected from the group consisting of hydrogen, silicon, metallic titanium and metallic aluminum, in the presence of a complex of aluminum chloride or aluminum bromide with an electron-donor selected from the group consisting of oxygen-containing organic compounds, nitrogen-containing organic compounds and phosphorus-containing organic compounds, the amount of the complex being 0.005 to 0.5 mole per mole of the titanium trichloride component, optionally in the co-presence of a polysiloxane, preferably as the pulverizationassistant in an amount of 0.005 to 0.2 part by weight per part by weight of the titanium trichloride component, and extracting the micro-pulverized titanium trichloride component with a solvent selected from the group consisting of saturated aliphatic hydrocarbons, aromatic hydrocarbons and halogenated aromatic hydrocarbons; and (B) an organoaluminum compound can exhibit much improved catalytic activity over a catalyst comprising a titanium trichloride composition obtained merely by co-pulverizing the titanium trichloride component together with aluminum chloride to activate it. It has also been found that not only aluminum chloride but also aluminum bromide may be used for the preparation of the complex present when the micro-pulverization is conducted and that such complex exhibits an activity similar even to the titanium trichloride component obtained by reduction of titanium tetrachloride with metallic aluminum. Moreover, it has been found that if a polysiloxane is present when the titanium trichloride component is micro-pulverized in the presence of the complex, the activating effect can be conspicuously increased.

When a polysiloxane is present as a pulverizing assistant in the micro-pulverizing treatment, the operation is conducted substantially in the same manner as in the case where the micro-pulverization is effected only in the presence of the complex. In each case, it is possible to provide a titanium trichloride catalyst component exhibiting a much higher activity toward increasing the sterospecific characteristics of the resulting polymers than heretofore proposed titanium trichloride catalyst components.

The titanium trichloride catalyst component of the invention, when combined with an organometallic compound, exhibits a much higher polymerizing activity than the conventional titanium trichloride catalyst components, even when it is prepared by micro-pulverization effected in the presence of the complex alone. When the micro-pulverization is conducted in the co-presence of a polysiloxane, as the polymerization assistant the polymerizing activity of the resulting titanium trichloride component is prominently increased.

Indeed, many attempts have heretofore been made to improve the activity of increasing the stereospecific characteristics of the resulting polymers by adding a variety of polar compounds to titanium trichloride itself or a catalyst system comprising titanium trichloride and an organoaluminum compound. However, in many cases, the improvements are confined to the stereospecific characteristics of the resulting polymers, and substantially no attempts have succeeded in substantially improving the activity of the catalyst for polymerizing olefins.

In contrast, the titanium trichloride catalyst component of the invention is quite unusual in that it can not only enhance the stereospecific characteristics of the resulting polymers but also exhibits a highly improved polymerization activity.

In the preparation of the titanium trichloride catalyst component of the invention, an electron-donor is added to the micro-pulverization system in the form of a complex with aluminum chloride or aluminum bromide which is a strong Lewis base, and therefore, during the micro-pulverization of the titanium trichloride component with such complex, which treatment is essential in conducting the catalyst modification according to this invention, occurrence of a direct reaction between the electron-donor and the titanium trichloride, which is likely to adversely influence the polymerization activity, can be conveniently prevented. Further, since most of the useful complexes take a form of a crystalline solid, they are easy to handle and undesired phenomena such as sticking or adhesion of pulverized substances can be inhibited during the micro-pulverization, with the result that it is possible to increase the micro-pulverization efficiency. Still further, although aluminum chloride is very difficultly soluble in most of the organic solvents to be used in the extracting and washing step which is another essential step conducted after the micro-pulverization, the above complex of the electron-donor with aluminum chloride is easily soluble in such organic solvent and is readily removed by the extraction and washing. Accordingly, it is possible to sufficiently inhibit occurrence of an undesired phenomenon that the aluminum chloride or electron-donor or the complex remains in the titanium trichloride catalyst component after the modification treatment and adversely influences the polymerization. These are some of the advantages of this invention.

It has also been found that the unusual catalytic activities such as exhibited by the catalyst of the invention cannot be attained at all by a catalyst prepared by omitting the above-mentioned step of micro-pulverizing the titanium trichloride component in the presence of the complex of an electron-donor and aluminum chloride or aluminum bromide, namely a catalyst prepared merely by adding such complex of aluminum chloride or bromide to a catalyst system comprising a micro-pulverized product of titanium trichloride obtained by reduction of titanium tetrachloride with hydrogen, silicon or metallic titanium, and an organoaluminum compound.

Further, it has been found that a catalyst component obtained by merely micro-pulverizing a titanium trichloride component obtained by reduction of titanium tetrachloride with hydrogen, silicon, metallic titanium or metallic aluminum in the presence of the abovementioned complex of aluminum chloride or aluminum bromide with an electron-donor exhibits only an olefin-polymerizing activity similar or inferior to that of a catalyst component obtained by conducting the micro-pulverization of the titanium trichloride component without addition of such complex, and that if in the preparation of the titanium trichloride catalyst component the step of extraction and washing with the above solvent is omitted, either the intended improvement of the polymerization activity or the intended improvement of the stereospecific property and crystallinity in resulting olefin polymers cannot be attained.

As is seen from the foregoing description, the primary object of this invention is to provide a highly improved process for polymerizing or copolymerizing alpha-olefins and a catalyst composition to be used therefor.

Other objects and advantages of the invention will be apparent from the description given hereinbelow.

The starting titanium trichloride component to be used in this invention has been known in the art, and it includes titanium trichloride free of other components, which is obtained by reduction of titanium tetrachloride with hydrogen, silicon or metallic titanium, and titanium trichloride containing aluminum chloride, which is obtained by reduction of titanium tetrachloride with metallic aluminum.

In this invention, such titanium trichloride component is micro-pulverized in the presence of a complex of aluminum chloride or aluminum bromide with an electron-donor selected from the group consisting of oxygen-containing organic compounds, nitrogen-containing organic compounds and phosphorus-containing organic compounds. The preparation of the complex may be readily accomplished by dispersing powder of aluminum chloride or aluminum bromide in an aromatic hydrocarbon solvent such as benzene, toluene, xylene and chlorobenzene, and adding to the dispersion an electron-donor directly when it is liquid, or in the form of a solution in a solvent such as an aromatic hydrocarbon when it is solid, to thereby effect the complex-forming reaction. It is desired to conduct the complex-forming reaction in the absence of molecular oxygen, and generally the reaction is carried out in a nitrogen atmosphere. The reaction is allowed to advance at room temperature, and in general, the reaction is effected at temperatures of from 25° to 100° C.

The recovery of the resulting complex may be accomplished by removing the solvent under reduced pressure or precipitating the complex by diluting the resulting reaction mixture by addition of a great amount of an aliphatic hydrocarbon solvent such as hexane. Complexes which are solid at room temperature and are easily soluble in an aromatic, aliphatic or halogenated aromatic hydrocarbon to be used in the subsequent extracting and washing step, which will be detailed below, are especially preferred. As the aluminum chloride and aluminum bromide products obtained by pulverizing commercially available anhydrides may be used, and use of purified products obtained by subjecting these pulverized products to sublimation is especially preferred.

As the electron-donor to be used for forming a complex with aluminum chloride or aluminum bromide, an oxygencontaining organic compound selected from the group consisting of aliphatic ethers, aromatic ethers, aliphatic carboxylic acid esters, aromatic carboxylic acid esters, aliphatic ketones and aromtic ketones; a nitrogen-containing organic compound selected from the group consisting of aliphatic amines, aromatic amines and heterocyclic amines; and a phosphorus-containing organic compound selected from the group consisting of trialkyl phosphines, triaryl phosphines, trialkyl phosphites, triaryl phosphites ad hexaalkyl phosphoroamides may be mentioned.

More specifically, the following examples can be mentioned. As oxygen-containing organic compounds:

Saturated aliphatic monoethers of 2–32 carbon atoms having an alkyl radical, such as dimethyl ether, diethyl ether, di-n-propyl ether, diisopropyl ether, di-n-butyl ether, diisobutyl ether, methyl ethyl ether, methyl n-butyl ether, n-butyl n-pentyl ether, dioctyl ether, isoamyl cetyl ether, dicetyl ether, 2,2'-dibromodiethyl ether and 2,2'-dichlorodiethyl ether;

aliphatic ethers of 3–20 carbon atoms having at least one unsaturated aliphatic hydrocarbon radical, such as 2-methoxybutene, methyl methacryl ether, allyl ethyl ether, allyl butyl ether, 2-ethoxypropene, 6-methoxy-1-hexene, ethyl vinyl ether, methyl vinyl ether, 1-methoxy-2-octene, undecyl ethyl ether and didecenyl ether;

aromatic ethers of 7–16 carbon atoms having a saturated alkyl or aryl radical, such as anisole, phenetole, isopropyl phenyl ether, tolyl methyl ether, diphenyl ether, ditolyl ether, dimethoxybenzene, 1-ethoxynaphthalene and 1-phenoxynaphthalene;

monoethers and diethers of 7–16 carbon atoms which are halogenated and contain at least one aromatic radical, such as chloroanisole, bromoanisole, 4,4'-dibromophenyl ether, 2,4-dichloroanisole, 3,5-dibromoanisole, 2,6-diiodoanisole, 2,3,5-trichloroanisole and bromophenetole;

saturated aliphatic monocarboxylic acid saturated alkyl esters having an aliphatic monocarboxylic acid residual group of 1–21 carbon atoms and a saturated alkyl radical of 1-16 carbon atoms, such as methyl formate, ethyl formate, butyl formate, ethyl acetate, n-butyl acetate, sec-butyl acetate, octyl acetate, butyl butyrate, methyl caproate, amyl caprylate, ethyl laurate, methyl palmitate, ethyl stearate and cetyl palmitate;

saturated aliphatic monocarboxylic acid unsaturated alkyl esters having a saturated aliphatic monocarboxylic acid residual group of 1-8 carbon atoms and an unsaturated alkyl radical of 2-12 carbon atoms, such as vinyl acetate, allyl acetate, propenyl acetate, undecenyl acetate and hexenyl propionate unsaturated aliphatic monocarboxylic acid alkyl esters having an unsaturated aliphatic monocarboxylic acid residual group of 2-12 carbon atoms and a saturated or unsaturated alkyl radical of 1-10 carbon atoms, such as methyl acrylate, n-amyl acrylate, n-decyl acrylate, ethyl crotonate, methyl isocrotonate, methyl methacrylate, n-butyl methacrylate, methyl undecylenate, methyl 3-methyltetradecenate-(13), phenyl acrylate and vinyl undecylenate;

aromatic monocarboxylic acid saturated alkyl esters having an aromatic monocarboxylic acid residual group of 7-18 carbon atoms and an alkyl radical of 1-20 carbon atoms, such as methyl benzoate, ethyl benzoate, butyl benzoate, n-propyl benzoate, iso-propyl benzoate, sec-butyl benzoate, tert-butyl benzoate, n-amyl benzoate, isoamyl benzoate, neopentyl benzoate, ethyl o-, m- and p-toluylates, butyl o-, m- and p-toluylates, ethyl o-, m- and p-bromobenzoates, ethyl o-, m- and p-chlorobenzoates, ethyl 1,2-naphthoate and butyl 1,2-naphthoate;

saturated aliphatic mono ketones of 3-20 carbon atoms, such as acetone, methyl ethyl ketone, methyl propyl ketone, methyl isobutyl ketone, methyl tert-butyl ketone, ethyl butyl ketone, dibutyl ketone, methyl amyl ketone, ethyl amyl ketone, 2-chlorobutyl ketone, ethyl 2-chlorobutyl ketone and 2-ethoxyethyl methyl ketone;

saturated aliphatic diketones of 4-12 carbon atoms, such as acetylacetone, diacetyl and acetonylacetone; and aromatic monoketones of 7-18 carbon atoms, such as acetophenone, ethyl phenyl ketone, benzophenone, dypnone, cinnamyl methyl ketone, cinnamyl ethyl ketone, n-butyl phenyl ketone, tert-butyl phenyl ketone, propyl phenyl ketone, anthraquinone, anthrone, 2-acetylnaphthalene, naphthoquinone, benzoquinone and fluorenone. As nitrogen-containing organic compounds:

Saturated aliphatic primary amines of 1-18 carbon atoms, such as methylamine, ethylamine, butylamine, isobutylamine, 3-amino-2-methylbutane, octylamine and octadecylamine;

saturated aliphatic secondary amines of 2-24 carbon atoms, such as dimethylamine, diethylamine, dibutylamine and didodecylamine;

saturated aliphatic tertiary amines of 3-18 carbon atoms, such as trimethylamine, tributylamine and trihexylamine;

aromatic amines of 6-20 carbon atoms, such as aniline, o-, m- and p-toluidines, xylidine, naphthylamine, N-methylaniline, N-ethylaniline, N,N-dimethylaniline, diphenylamine and triphenylamine; and heterocyclic amines of 5-18 carbon atoms, such as pyridine, 2-picoline, 3-picoline, 5-ethyl-2-methyl pyridine, 2-phenyl pyridine, 1,2,3,4-tetramethyl pyridine, 2-chloropyridine, 2-bromopyridine, 3-chloropyridine, 3-bromopyridine, 3-iodopyridine, 3,4-dichloropyridine, 2,3,4-trichloropyridine, 2,3,4,6-tetrachloropyridine, pentachloropyridine, 2,3-dibromopyridine, 2,3,5-tribromopyridine, 2-chloro-6-methyl pyridine, 2-chlorophenyl pyridine, quinoline, isoquinoline, 2-methylquinoline, 3-phenylquinoline, 6-methylquinoline, 2,4dimethylquinoline, 4,6-dimethyl-2-phenylquinoline, 3-fluoroquinoline, 4-bromoquinoline, 2,6-dichloroquinoline, 5,6-diiodoquinoline, 6-bromo-2-chloroquinoline, 1-methylisoquinoline, 1,3-dimethylisoquinoline, 4-bromoisoquinoline, acridine and 2-chloroacridine.

As phosphorus-containing organic compounds:

Trialkyl phosphines of 3-21 carbon atoms and triaryl phosphines of 18-21 carbon atoms, such as trimethylphosphine, triethylphosphine, ethyldimethylphosphine, triisopropylphosphine, triphenylphosphine and tris(trifluoromethyl) phosphine;

trialkyl phosphites of 3-24 carbon atoms, such as trimethyl phosphites, triethyl phosphite, tripropyl phosphite, tributyl phosphite and tris(6-ethylhexyl) phosphite;

triaryl phosphites of 18-24 carbon atoms, such as triphenyl phosphite, tricresyl phosphite, tritolyl phosphite, trixylyl phosphite and diphenylethyl phosphite; and hexaalkyl phosphoroamides of 1-4 carbon atoms in each alkyl group, such as hexamethyl phosphorotriamide, hexaethyl phosphorotriamide, hexapropyl phosphoro-triamides and hexabutyl phosphorotriamides.

Among the above-mentioned compounds ethers such as dimethyl ether, diethyl ether, diphenyl ether, anisole, p-chloroanisole and phenetole; carboxylic acid esters such as methyl benzoate, ethyl benzoate and dimethyl phthalate; ketones such as acetylacetone, acetophenone and benzophenone; amines such as triethylamine, dimethylaniline and triphenylamine; nitrogen-containing heterocyclic compounds such as pyridine and picoline; phosphines such as triphenylphosphine; and hexaalkyl phosphoroamides such as hexamethyl phosphorotriamide are especially preferred.

In the preparation of the titanium trichloride composition to be used as one of the catalyst components in this invention, the complex is present in an amount of 0.005-0.5 mole, preferably 0.01-0.3 mole, per mole of the titanium trichloride component obtained by reduction of titanium tetrachloride when the titanium trichloride is micro-pulverized. When the amount of the complex is smaller than the lower limit of the above range during the micro-pulverizing step, the intended improvement of this invention cannot be substantially attained. If the amount of the complex is too large, the complex remains in the resulting titanium trichloride catalyst component, with the result that the intended improvement cannot be substantially attained.

The complexes may be either liquid or solid at room temperature, but in view of the efficiency of the micro-pulverization, it is preferable to use complexes in the solid state.

The micro-pulverization may be conduced either by the dry method or by the wet method with use of an ordinary ball mill or a so-called micro-pulverizer such as a vibratory mill or impact mill. The pulverization may be performed either batchwise or continuously. In order to prevent degradation of the titanium trichloride caused by additives, it is preferable in this invention to carry out the micro-pulverization at a temperature approximating room temperature. The term "wet pulverizing method" used herein means the method where the pulverization is conducted in the presence of the above-mentioned pulverizing assistant, and a method where the pulverization system is made wet by addition of another substance is excluded from the wet method of the invention. The micro-pulverization is conducted at least to such an extent as can sufficiently convert an ordinary titanium trichloride product obtained by reduction of titanium tetrachloride with metallic aluminum, to titanium trichloride of the δ-type.

The pulverization may be carried out at room temperature, but if desired, it may be performed at lower or higher temperatures, for instance, −20° C. to + 100° C. The pulverization can be performed in an atmosphere of an inert gas such as nitrogen gas, and if desired, another inert gas such as argon or helium may be used.

In conducting the pulverization according to this invention, in order to prevent occurrence of undesired phenomena such as sticking or adhesion of pulverized substances to the pulverizing vessel or pulverizing medium, it is possible to employ a pulverizing assistant. For this purpose, polysiloxanes are especially effective.

As preferred polysiloxanes alkyl, aryl or alkylaryl polysiloxanes, α- and/or ω-dihaloalkyl polysiloxanes, alkyl cyclopolysiloxanes can be mentioned and aryl cyclopolysiloxanes.

It is especially preferable to use as the pulverizing assistant a member selected from the group consisting of alkyl, aryl and alkylaryl polysiloxanes of the formula $R(R'R''SiO)_xSiR_3$ in which R, R' and R'', which may be the same or different, represent an alkyl group having 1 to 4 carbon atoms or an aryl group having 6 to 8 carbon atoms, R'' may be hydrogen, and x is an integer of 1 to 1000; α- and/or ω-halosubstituted products of the above polysiloxanes; alkyl and aryl cyclopolysiloxanes of the formula $(R'''HSiO)_y$ in which R''' is an alkyl group having 1 to 4 carbon atoms or an aryl group having 6 to 8 carbon atoms and y is an integer of 3 to 8; alkyl polysiloxanes of the formula $(R''''_2SiO)_z$ in which R'''' is an alkyl group having 1 to 4 carbon atoms and z is an integer of 3 to 9; and aryl cyclopolysiloxanes of the formula $(Q_2SiO)_p$ in which Q is an aryl group having 6 to 8 carbon atoms and p is an integer of 3 to 6.

Specific examples of such polysiloxanes include those recited hereinbelow as "silicon-containing organic compounds" included within the group of organic polar compounds to be used in combination with the extracting solvent in the invention.

Especially preferred polysiloxanes are straight or cyclic, methyl polysiloxanes, phenyl polysiloxanes and methylphenyl polysiloxanes which are liquid at room temperature.

Such pulverizing assistant is added to the pulverization system in an amount of 0.005–0.2 part by weight, preferably 0.01–0.1 part by weight, per part by weight of the titanium trichloride component to be pulverized.

The micro-pulverized titanium trichloride component is then extracted with a solvent selected from the group consisting of saturated aliphatic hydrocarbons, aromatic hydrocarbons and halogenated aromatic hydrocarbons.

Examples of such solvents are as follows:

Saturated aliphatic hydrocarbons of 3–20 carbon atoms, such as propane, butane, pentane, hexane, 3-methylpentane, 2,3-dimethylbutane, n-heptane, 2-methylhexane, n-octane, iso-octane, n-decane, n-dodecane, heptadecane, n-eicosane and kerosene;

aromatic hydrocarbons of 6–20 carbon atoms which may be substituted by $C_1$–$C_{20}$ alkyl radicals, $C_7$–$C_{15}$ aralkyl radicals or $C_6$–$C_S$ aryl radicals, such as benzene, toluene, xylene, ethylbenzene, cumene, ethyltoluene, trimethylbenzene, tetramethylbenzene, hexamethylbenzene, 1,2,4,5-tetraisopropyl benzene, cymene, diphenyl, diphenylmethane, diphenylethane, triphenylmethane, naphthalene, α-methylnaphthalene, β-methylnaphthalene, 2,6-dimethylnaphthalene and 1-(n-dodecyl)-naphthalene; and halogenated aromatic hydrocarbons of 6–16 carbon atoms, such as chlorobenzene, bromobenzene, iodobenzene, fluorobenzene, o-, m- and p-dichlorobenzenes, o-, m- and p-dibromobenzenes, o-, m- and p-diiodobenzenes, 1,2,4,5-tetrachlorobenzene, hexachlorobenzene, pentabromobenzene, 2-fluoro-1-chlorobenzene, 4-bromo-1-iodobenzene, o-, m- and p-fluorotoluenes, o-, m- and p-bromotoluenes, 2-chloro-m-xylene, 1,2,4,5-tetramethyl-3-chlorobenzene, amyl-4-bromobenzene, benzyl chloride, benzylidene chloride, 1-chloronaphthalene, 1-bromonaphthalene, 1-fluoronaphthalene, 5-chlorotetralin, 2-bromodihydronaphthalene, 1,2,3,4,5,8-hexachlorotetralin, 1-chloro-2-methylnaphthalene, 1-chloro-2-phenylnaphthalene, 1-chloro-(4-chloromethyl)-naphthalene, 1,4-dichloronaphthalene, 2,4-dibromo-1-chloronaphthalene, 1,3,6,7-tetrabromonaphthalene, octachloronaphthalene, 2-chloroanthracene, 1-chloroanthracene, 2,3-dibromoanthracene and 1,9,10-trichloroanthracene.

Among these compounds, aromatic hydrocarbons and halogenated aromatic hydrocarbons are especially preferred used. The temperature for the extraction and washing may be chosen within a range of from room temperature to the boiling point of the extracting solvent present in the extraction system, preferable temperatures being in the range of from 50 to 100° C. The extraction and washing may be conducted in various manners. For instance, when the extraction is conducted batchwise, a method comprising removing the extracted matter by decantation may be adopted or an extracting method employing a Soxhlet's extractor may be utilized. Also a counter-current extracting and washing method flowing the solvent continuously may be adopted. Whatever method may be adopted, it is necessary to remove the liquid portion from the treated titanium trichloride component as soon as possible after the completion of the extraction and washing. The intended titanium trichloride composition cannot be obtained by a method comprising merely heating the micropulverized titanium trichloride with a solvent-containing extract and then allowing the solvent to evaporate by heating.

In conducting the above extraction, an organic polar compound selected from the group consisting of oxygen-containing organic compounds, nitrogen-containing organic compounds and silicon-containing compounds may be used in combination with the extracting solvent.

In addition to oxygen-containing and nitrogen-containing organic compounds mentioned with respect to the complex-forming reaction and silicon-containing compounds mentioned as the pulverizing assistant, these organic compounds of broader ranges may be used as such organic polar compounds.

More specifically, the following examples are mentioned.

As oxygen-containing organic compounds:

Saturated aliphatic monoethers of 2–32 carbon atoms having an alkyl radical, such as exemplified hereinabove;

aliphatic ethers of 3–20 carbon atoms having at least one unsaturated aliphatic hydrocarbon radical, such as exemplified hereinabove;

aromatic ethers of 7–16 carbon atoms having a saturated alkyl or aryl radical, such as exemplified hereinabove;

monethers and diethers of 7–16 carbon atoms which are halogenated and contain at least one aromatic radical, such as exemplified hereinabove;

saturated aliphatic monocarboxylic acid saturated alkyl esters having an aliphatic monocarboxylic acid residual group of 1–21 carbon atoms and a saturated alkyl radical of 1–16 carbon atoms, such as exemplified hereinabove;

saturated aliphatic monocarboxylic acid unsaturated alkyl esters having a saturated aliphatic monocarboxylic acid residual group of 1–8 carbon atoms and an unsaturated alkyl radical of 2–12 carbon atoms, such as exemplified hereinabove;

unsaturated aliphatic monocarboxylic acid alkyl esters having an unsaturated aliphatic monocarboxylic acid residual group of 2–12 carbon atoms and a saturated or unsaturated alkyl radical of 1–10 carbon atoms, such as exemplified hereinabove;

aromatic monocarboxylic acid saturated alkyl esters having an aromatic monocarboxylic acid residual group of 7–18 carbon atoms and an alkyl radical of 1–20 carbon atoms, such as exemplified hereinabove;

saturated aliphatic monoalcohols of 1–18 carbon atoms, such as methanol, ethanol, n-propanol, isopropanol, n-butanol, isobutanol, sec-butanol, tert-butanol, 1-pentanol, isoamyl alcohol, neopentyl alcohol, 3-pentanol, 3-methyl-butanol-2, hexanol, octanol, lauryl alcohol, cinnamyl alcohol, phenyl ethanol, cetyl alcohol, ethoxyethanol, 2-chloropropanol, 2-bromopropanol, 3-chloropropanol, ethoxybutanol and 4-chlorobutanol;

monohydric and dihydric phenols of 6–16 carbon atoms, such as phenol, o-, m- and p-cresols, thymol, o-chlorophenol, o-bromophenol, p-chlorophenol, p-bromophenol, tribromophenol, catechol, resorcinol, guaiacol, eugenol, isoeugenol, o-allylphenol, 1,2-naphthols and anthranol;

saturated aliphatic ketones of 3–20 carbon atoms, saturated aliphatic diketones of 4–12 carbon atoms and aromatic monoketones of 7–18, those being exemplified hereinabove;

aromatic monocarboxylic acids of 7–18 carbon atoms, such as benzoic acid, o-, m- and p-toluic acids, o-, m- and p-chlorobenzoic acids, o-, m- and p-bromobenzoic acids, and 1,2-naphthoic acid;

saturated aliphatic monocarboxylic acids of 1–20 carbon atoms, such as formic acid, acetic acid, propionic acid, valeric acid, octylic acid, undecylenic acid and stearic acid;

saturated aliphatic carboxylic acid halides of 2–12 carbon atoms, such as acetic acid chloride, propionic acid chloride and lauric acid chloride;

aromatic carboxylic acid halides of 7–15 carbon atoms, such as benzoic acid chloride, o-, m- and p-toluic acid chlorides, o-, m- and p-chlorobenzoic acid chlorides and 1,2-naphthonic acid chloride; and aliphatic or aromatic aldehydes such as butyl aldehyde and benzaldehyde.

As nitrogen-containing organic compounds:

Saturated aliphatic secondary amines of 2–24 carbon atoms, saturated aliphatic tertiary amines of 3–18 carbon atoms, aromatic amines of 6–20 carbon atoms and heterocyclic amines of 5–18 carbon atoms, those being exemplified hereinabove;

aromatic mononitriles of 7–15 carbon atoms such as benzonitrile, o-, m- and p-tolunitriles, dimethylbenzonitrile, 4-isopropyl benzonitrile, α-naphthonitrile, β-naphthonitrile and 9-cyanoanthracene;

aromatic monoisocyanates of 7–11 carbon atoms, such as phenyl isocyanate, toluyl isocyanate, α-naphthyl isocyanate, β-naphthyl isocyanate and 2,4-dimethyl phenyl isocyanate; and aromatic azo compounds of 12–20 carbon atoms having no substituent other than hydrocarbon radicals or halogens, such as azobenzene, o-, m- and p-azotoluenes, 1,1'-azonaphthalene and 2,2'-azonaphthalene. As silicon-containing organic compounds (which in the present invention includes those containing oxygen, nitrogen or sulfur besides silicon):-

Silicon-containing organic compounds selected from the group consisting of monomer type compounds such as tetrahydrocarbylsilanes, organohydrogenosilanes, organohalogenosilanes, organoaminosilanes, organoalkoxysilanes, organoaryloxysilanes, organosilicon isocyanates and organosilanol carboxylic acid esters; and polymer type compounds such as polysilalkylenes, organopolysilanes, organopolysiloxanes, α,β-dihaloorganopolysiloxanes, organocyclopolysiloxanes and polysilazanes.

These silicon-containing organic compounds will now be described more specifically:

Monomer type compounds (which contain one silicon atom in the molecule) represented by the general formula:

$R_n SiY_{4-n}$ wherein R's are alkyl or aryl radicals, Y's are substituents of various kinds, and n is 1 to 4.

n=4

Tetrahydrocarbylsilanes having saturated alkyl radicals and/or aryl radicals of 4–50 carbon atoms, such as tetramethylsilane, tetraethylsilane, tetrabutylsilane, tetraundecylsilane, tetra-n-octadecylsilane, ethyltrimethylsilane, trimethylpropylsilane, diethyldiphenylsilane, ethyltriphenylsilane, tetraphenylsilane, tetra (o-tolyl) silane, tetrabenzylsilane, tetra (p-diphenyl)silane and 2-naphthyltriphenylsilane.

n=4

Tetrahydrocarbylsilanes having an unsaturated alkyl radical of 5–28 carbon atoms, such as trimethylvinylsilane, isopropenyltrimethylsilane, vinyltriphenylsilane, benzylvinylsilane and trimethylallylsilane.

n=1 to 3. Y=hydrogen

Saturated or unsaturated alkyl hydrogensilanes of 1–30 carbon atoms or aryl hydrogenosilanes of up to 30 carbon atoms having at least one Si—H bond such as methylsilane, dimethylsilane, trimethylsilane, tri-n-propylsilane, diphenylsilane, triphenylsilane, tritolylsilane and diphenylvinylsilane.

n=1 to 3. Y-halogens.

Saturated or unsaturated alkyl halogenosilanes of 3–30 carbon atoms or aryl halogenosilanes of 6–30 carbon atoms having at least one Si-halogen bond, such as trichloromethylsilane, dichlorodimethylsilane, tripropylchlorosilane, diallyldichlorosilane, phenyltrichlorosilane, diphenyldichlorosilane, triphenylchlorosilane, tribenzylchlorosilane, triethylfluorosilane, diphenyldifluorosilane, triethylbromosilane, diphenyldibromosilane, triethyliodosilane, chlorodifluoromethylsilane, chloroethyldifluorosilane and dichlorofluoropropylsilane.

n=1 to 3, Y=NH$_2$

Trialkyl silyl amines of 3-18 carbon atoms or triaryl silyl amines of up to 30 carbon atoms or their N-alkylamino derivatives, such as triethylsilylamine, tripropylsilylamine, triphenylsilylamine, trimethyl (N-methylamino)silane or other trialkyl (N-alkylamino) silanes and trimethyl (N,N-diethylamino)silane.

n=1 to 3. Y=alkoxy or aryloxy

Saturated alkyl or aryl silanes having at least one Si-O-C bond, such as methoxymethylsilane, dimethoxydimethylsilane, trimethoxymethylsilane, diethoxydimethylsilane, ethoxytriethylsilane, diethoxydiethylsilane, trimethylphenoxysilane and triethylphenoxysilane.

n=1 to 3. Y=OCOR (R: alkyl, aryl)

C$_1$-C$_{10}$ aliphatic or C$_7$-C$_{11}$ aromatic monocarboxylic acid esters of C$_3$-C$_{10}$ trialkyl, C$_8$-C$_{20}$ alkylaryl or C$_{18}$-C$_{30}$ triaryl silanols, such as trimethylacetoxysilane, triethylacetoxysilane, triphenylacetoxysilane, trimethylbenzoyloxysilane, trimethylpropionylsilane and triethylcaproylsilane.

N=1 to 3. Y=NCO (isocyanate)

Organosilicon monoisocyanates having C$_3$-C$_{10}$ trialkyl, C$_8$-C$_{15}$ dialkylaryl or C$_{18}$-C$_{30}$ triaryl, such as trimethyl silicon isocyanate, dimethyl silicon isocyanate, tributyl silicon isocyanate and triphenyl silicon isocyanate.

Polymer type compounds (which contain at least two silicon atoms in the molecule):

Polysilmethylenes represented by the formula CH$_3$Si CH$_2$ [(CH$_3$)$_2$Si CH$_2$]$_x$Si(CH$_3$)$_3$ (wherein x is 1 to 10), such as hexamethyldisilmethylene, hexaethyldisilmethylene, hexa-n-propyldisilmethylene, decamethyltetrasilmethylene and dodecamethylpentasilmethylene are typical, but in general the polysilmethylenes are represented by the general formula R$_3$SiCH$_2$[R$_2$SiCH$_2$]$_n$SiR$_3$ (wherein R's are alkyl or aryl radicals).

Linear polyalkyl polysilanes of 6-80 carbon atoms or polyaryl polysilanes of up to 80 carbon atoms, such as hexamethyldisilane, sym-diethyldi-n-propyldiphenyldisilane, symdiethyldi-n-propyldibenzyldisilane, hexaphenyldisilane, hexa(pdiphenyl)disilane and octaphenyltrisilane.

As derivatives thereof, alkoxy polysilanes such as 1,1,2,2-tetramethyl-1,2-diethoxydisilane and pentamethylethoxydisilane.

Polyalkyl and/or polyaryl cyclopolysilanes of 12-120 carbon atoms, such as dodecamethylcyclohexasilane and octaphenylcyclotetrasilane.

Dialkylpolysilanes, alkylarylpolysilanes and diarylpolysilanes which are linear molecules represented by the general formula:

R(R'R"SiO)$_x$SiR$_3$ wherein R, R', R" which may be the same or different, represent alkyl radical of 1-4 carbon atoms, aryl radical of 6-8 carbon atoms, with the proviso that R" can also be hydrogen, and x stands for an integer of 1-1000, such as hexamethyldisiloxane, decamethyltetrasiloxane, tetracosamethylundecasiloxane, 3-hydroheptamethyltrisiloxane, 3,5-dihydrooctamethyltetrasiloxane, 3,5,7-trihydrononamethylpentasiloxane, tetramethyl-1,3-diphenyldisiloxane, pentamethyl1,3,5-triphenyltrisiloxane, hexaphenyldisiloxane and octaphenyltrisiloxane.

As compounds obtained by halogenating both ends of the molecule of the above compounds, α,ω-dihaloalkylpolysiloxanes represented by the general formula:

X(R$_2$SiO)$_x$SiR$_2$X wherein X is a halogen atom and x is 1 to 1000, and R is as defined above, such as 1,3-dichlorotetramethyldisiloxane, 1,5-dichlorohexamethyltrisiloxane and 1,7-dichlorooctamethyltetrasiloxane.

Alkylcyclopolysiloxanes represented by the general formula:

(R'''HSiO)$_y$ wherein R''' is an alkyl radical of 1-4 carbon atoms and y stands for an integer of 3 to 8, such as 2,4,6-trimethylcyclotrisiloxane and 2,4,6,8-tetramethylcyclotetrasiloxane.

Alkylcyclopolysiloxanes represented by the general formula:

(R''''$_2$SiO)$_z$ wherein R'''' is an alkyl radical of 1-4 carbon atoms and z stands for an integer of 3 to 9, such as hexamethylcyclotrisiloxane, octamethylcyclotetrasiloxane, decamethylcyclopentasiloxane and dodecamethylcyclohexasiloxane.

Arylcyclopolysiloxanes represented by the general formula:

(Q$_2$SiO)$_p$ wherein Q is an aryl radical of 6-8 carbon atoms and p stands for an integer of 3 to 6, such as 1,3,5-triphenyl-1,3,5-trimethylcyclotrisiloxane, hexaphenylcyclotrisiloxane and octaphenylcyclotetrasiloxane.

Alkyl or aryl polysilazanes having 6-50 carbon atoms having an Si-N-Si bond and a molecular weight not more than 1000, such as hexamethylsilazane, hexamethyltrisilazane, N-methylhexamethylsilazane, octamethylcyclotetrasilazane, hexaphenylcyclotrisilazane, hexaethylcyclotrisilazane, hexaphenylcyclotrisilazane, hexa(n-butyl)cyclotrisilazane and hexaphenylcyclotrisilazane.

Especially preferable compounds among the above-exemplified organic polar compounds are, for instance, saturated aliphatic ethers such as diethyl ether and butyl ether; aromatic ethers such as anisole, p-chloroanisole, phenetole and diphenyl ether; saturated aliphatic ketones such as acetone, methyl ethyl ketone and butyl ethyl ketone; alicyclic ketones such as cyclohexanone; saturated aliphatic carboxylic acid esters such as butyl formate and butyl acetate; and unsaturated aliphatic carboxylic acid esters such as ethyl acrylate.

In this invention, the ratio of the pulverized titanium trichloride component to the extracting solvent may be optionally chosen, as long as no disadvantage is brought about in conducting unit operations such as extraction, washing and filtration. In general, however, it is preferred that the amount of the extracting solvent used is 1-100 parts by weight per part by weight of the pulverized titanium trichloride component. The amount of the organic polar compound to be used in combination with the extracting solvent is selected depending on the polarity thereof. Generally, in the case of the oxygen-containing organic compound, it is used in an amount of 0.005-10.0 moles per mole of the pulverized titanium trichloride component, preferably 0.01-10.0 moles in the case of ethers, 0.01-5.0 moles in the case of ketones and esters, 0.005-0.2 mole in the case of aldehydes and phenol, and 0.005-0.5 mole in the case of organic acids and acid halides. Especially in the case of ethers, if they are added in amounts somewhat in excess of the above range, the catalytic activity of the resulting titanium trichloride composition is not degraded. The nitrogen-containing organic compounds are usually added in amounts of 0.005-0.5 mole per mole of the pulverized titanium trichloride component. Preferable amounts are 0.01-0.5 mole in the case of nitrogen-containing heterocyclic compounds and aromatic tertiary amines, and 0.005-0.2 mole in the case of aliphatic tertiary amines, isocyanates, azo compounds and secondary amines. The amount of the silicon-containing organic compound used is not particularly critical but it is preferred that it is used in an amount of 0.01-15 parts by weight per part by weight of the pulverized titanium trichloride component, for instance, 0.05-10 parts by weight in the case of organohalogenosilanes, 0.05-5.0 parts by weight in the case of organoalkoxysilanes, organoaryloxysilanes and organopolysiloxanes, 0.02-2.0 parts by weight in the case of organosilanol carboxylic acid esters, organosilazanes and organosilthianes, and 0.02-1.0 part by weight in the case of organosilanols and organosilicon isocyanates.

The condition for contacting the pulverized titanium trichloride component with an extracting solvent including the above organic polar compound is not particularly critical in this invention. They may be mixed at room temperature and allowed to stand for a long time. Further, it is possible to accomplish the contact by heating or cooling them under agitation. In general, it is preferred to conduct the contact at 20°-100° C. for several minutes to several days.

After the contact, the so treated titanium trichloride component is separated from the liquid extract, and it may be used as a catalytic component as it is separated. However, it is generally preferable to use it after it has been washed with the extracting solvent used for extraction. The washing may be performed batchwise or, by using a Soxhlet's extractor continuously in a countercurrent manner. Whatever method may be adopted for washing, it is necessary to separate the titanium trichloride component from the extractant containing the extracted polar substance as completely as possible.

The titanium trichloride component which has been subjected to the extraction and washing by either of the above methods is then dried under atmospheric or reduced pressure and is used as the titanium trichloride composition (A) for the polymerization in combination with an organoaluminum compound (B). This titanium trichloride composition may be reserved in the state suspended in a polymerization solvent.

The catalyst to be used in this invention consists essentially of an organoaluminum compound and the titanium trichloride composition obtained by the aforementioned procedures. Any of organoaluminum compounds that are known as one component of the Ziegler type catalyst may be used in the invention.

Examples of such organoaluminum compounds include, for instance, trialkyl aluminum, dialkyl aluminum halides, lithium aluminum tetraalkyl, dialkylaluminum alkoxides, alkylaluminum alkoxy halides, alkylaluminum dihalides, reaction products of these organoaluminum compounds with electron-donors, and reaction products of these organoaluminum compounds with metal halides or alkali metal complex fluorides of transition metals. Examples of the electron donors are introduced in, for instance, the specifications of U.S. Pat. No. 3,081,287, No. 3,116,274 and No. 3,230,208.

The olefin monomers to be polymerized with the catalyst of the present invention include, for instance, propylene, 1-butene, 4-methyl-1-pentene, styrene, 1-pentene, 3-methyl-1-butene, and trimethyl vinyl silane. The catalyst can also be applied to the copolymerization of ethylene with propylene, ethylene with 1-butene, ethylene with 1-hexene, or propylene with 1-butene. It may also be applied to the homopolymerization of ethylene.

The polymerization of olefins using the catalyst of this invention may be performed by any known means under known conditions. For instance, the polymerization can be carried out at a temperature of 20 to 100° C. and a pressure of from normal atmospheric pressure to 100 Kg/cm$^2$. The polymerization may be conducted in an inert solvent, or when a liquefied monomer acts as a solvent, the polymerization may be conducted in the absence of a solvent. Either the batchwise process or the continuous process may be adopted for the polymerization.

In the polymerization of olefins according to this invention, hydrogen may be used as an agent for regulating the molecular weight of the resulting olefin polymer. After completion of the polymerization, the catalyst is usually deactivated with lower alcohols such as methanol, ethanol, butanol and isopropanol by a customary method adopted in the Ziegler-Natta type polymerization of olefins. When, however, the yield of the polymer per unit amount of the catalyst is large, the aforementioned deactivating treatment may be omitted, and the catalyst may merely be contacted with air or steam.

The invention will now be described in more detail by referring to Examples and Comparative Examples, but the invention is not limited in any way by these Examples.

EXAMPLE 1 AND COMPARATIVE EXAMPLES 1-3

A 1-liter capacity reactor equipped with a stirrer, nitrogen inlet, condenser and dropping funnel was charged with 500 ml of benzene, and the atmosphere in the reactor was thoroughly nitrogen-substituted. Then 40 g of sublimation-refined aluminum chloride powder were dispersed therein, and 61.3 g of diphenyl ether were gradually added thereto under stirring in the nitrogen atmosphere. After the aluminum chloride was completely consumed by the reaction, the system was condensed at reduced pressure and room temperature, to cause precipitation of a solid product. The product was washed several times with cold hexane, and dried at reduced pressure and room temperature. Thus 89.7 g of light yellow, crystalline solid (melting point:

116–120° C.) were obtained, which was verified to be a 1:1 (mol ratio) complex of aluminum chloride and diphenyl ether, through its elementary analysis values, infrared absorption spectrum, etc.

Subsequently, 9.1 g of the aluminum chloride-diphenyl ether complex and 60 g of TiCl$_3$A (titanium trichloride component prepared by reduction of titanium tetrachloride with metallic aluminum) were added to a 800-ml capacity cylindrical stainless steel vessel under nitrogen atmosphere. Further the vessel was filled with 850 stainless steel balls each of 10 mm in diameter, sealed, and subjected to a vibration mill for 5 hours to be micropulverized.

Incidentally, the TiCl$_3$A employed was sampled from 1153 g of purplish red titanium trichloride component, which had been obtained by reacting 4 liters of titanium tetrachloride with 54 g of finely divided metallic aluminum in the presence of 3.0 g of aluminum chloride, at the boiling point of titanium tetrachloride, and thereafter removing from the system the unreacted titanium tetrachloride and free aluminum chloride.

After the pulverizing, the finely divided product was transferred into a Soxhlet's extractor with a glass filter, hot-extracted for 24 hours with chlorobenzene in a nitrogen atmosphere and then dried under reduced pressure at room temperature.

Separately, a 1-liter capacity four neck flask equipped with a stirrer, thermometer, propylene inlet and exhaust gas outlet was charged with 500 ml of refined kerosene and thoroughly nitrogen-substituted. Under the nitrogen atmosphere, 2.00 g of the above-obtained titanium trichloride component and 10 mmols of diethylaluminum chloride were added into the flask, and further gaseous propylene was blown thereinto at 70° C., to be polymerized for 2 hours. Thereafter the system was cooled, and 100 ml of methanol were added to decompose the catalytic component. The system was then filtered to separate a solid polymer, which was washed several times with methanol, and dried for 48 hours at reduced pressure, to provide 168.7 g of a solid polymer of 97.2% in crystallinity, and 0.375 in bulk density.

On the other hand, the methanol phase was removed from the filtrate to isolate the kerosene phase, which was condensed under reduced pressure to allow recovery of 2.9 g of the amorphous polymer dissolved therein. Thus, a total of 171.6 g of polypropylene was obtained. The average crystallinity of the total polymer was 95.6%.

The crystallinity of the total polymer was determined as follows:

Crystallinity of total polymer:-

The kerosene-insoluble powdery polymer was continuously n-heptane extracted for 30 hours, and fractionated into the hot n-heptane-soluble portion and insoluble portion. Then the crystallinity of the total polymer including the amorphous polymer recovered from the kerosene phase was determined in accordance with the formula below:

Crystallinity of total polymer =

$$\frac{\text{Weight of n-heptane-insoluble portion in kerosene-insoluble polymer}}{\text{Weight of kerosene-insoluble polymer + weight of kerosene-soluble polymer}} \times 100\ (\%)$$

For comparison, propylene polymerization of Example 1 was repeated except that the titanium trichloride component (TiCl$_3$AA) which was pulverized in the absence of the complex was employed (Comparative Example 1); that chlorobenzene-extraction step was omitted (Comparative Example 2); and that, in the above Comparative Example 1, the complex employed in Example 1 was added to the polymerization system (Comparative Example 3). The results of those Comparative Examples are given in Table 1 below, together with those of Example 1.

Table 1

|  | Catalyst | | | Additive | Polypropylene | |
|---|---|---|---|---|---|---|
|  | TiCl$_3$ Component | Solvent Extraction | Organoaluminum Compound | to Polymerization System | Total Weight (g) | Crystallinity (of total polymer) (%) |
| Ex. 1 | TiCl$_3$A was micropulverized in the presence of complex | Extracted with chlorobenzene | (C$_2$H$_5$)$_2$AlCl | — | 171.6 | 95.6 |
| Comp. Ex. 1 | TiCl$_3$A was micropulverized in the absence of complex (TiCl$_3$AA) | " | " | — | 58.8 | 92.0 |
| Comp. Ex. 2 | Same as Example 1 | No extraction | " | — | 103.5 | 88.5 |
| Comp. Ex. 3 | Same as Comparative Example 1 (TiCl$_3$AA) | Same as Comparative Example 1 | " | The complex employed in Example 1 was added (0.3 g) | 40.8 | 89.0 |

EXAMPLES 2–4, AND COMPARATIVE EXAMPLES 4–6

The procedures of Example 1 were repeated except that dimethyl polysiloxane (average molecular weight of about 14,000) was concurrently present in the micropulverizing system with the complex, as an assistant. The results were a given in Table 2 below.

Table 2

| | Treatment of TiCl₃ Catalytic Component | | | | Polypropylene | | |
|---|---|---|---|---|---|---|---|
| | Pulverizing Condition | | | Chlorobenzene Extraction (hr.) | Total Polymer Yield (g) | Crystallinity of Total Polymer (%) | Bulk Density of Solid Polymer |
| | TiCl₃A (g) | Complex (g) | Dimethyl Polysiloxane (g) | | | | |
| Ex. 2 | 60 | AlCl₃ · ⟨○⟩—O—⟨○⟩ | (9.1) | 6 | 24 | 199.0 | 96.1 | 0.381 |
| Comp. Ex. 4 | " | " | " | " | — | 123.7 | 89.7 | 0.363 |
| Ex. 3 | " | " | (13.7) | " | 24 | 172.1 | 95.1 | 0.377 |
| Comp. Ex. 5 | " | " | " | " | — | 90.5 | 88.0 | 0.344 |
| Ex. 4 | " | " | (18.2) | " | 24 | 168.2 | 94.2 | 0.378 |
| Comp. Ex. 6 | " | " | " | " | — | 62.7 | 87.5 | 0.347 |

EXAMPLE 5

A 500-ml capacity four neck flask equipped with a stirring rod, thermometer, nitrogen inlet, and an exhaust gas outlet was charged with 300 ml of refined toluene, and thoroughly nitrogen-substituted. Into the flask, 24 g of the micropulverized product of TiCl₃A and aluminum chloride-diphenyl ether complex as prepared in Example 1 were added, and the temperature therein was raised to 70° C. under stirring. Then 6.5 ml of anisole were added thereto, and the system was maintained at 70° C. as it was, for 2 hours. Thereafter the contents was quickly filtered through the glass filter, and the solid component was washed with toluene several times, and dried under reduced pressure at room temperature.

Propylene was polymerized at 70° C. for 2 hours in the presence of 2.00 g of above-obtained titanium trichloride component and 10 mmols of diethylaluminum chloride, similarly to Example 1. Thus, 165.2 g of solid polymer of 95.5% in crystallinity and 0.345 in bulk density, and 9.2 g of amorphous polymer from kerosene phase, were recovered. Therefore, the total yield of the polymer was 174.4 g, and crystallinity of total polymer was 90.5%.

EXAMPLE 6

Example 5 was repeated except that the micropulverized product was extracted with 300 ml of toluene containing 6.3 ml of anisole. Thus 171.7 g of solid polypropylene of 95.4% in crystallinity and 0.335 in bulk density, and 8.9 g of kerosene-soluble polymer, were obtained. The total yield of polymer was 180.6 g, and total crystallinity of the total polymer was 90.7%.

EXAMPLES 7-34 AND COMPARATIVE EXAMPLE

Example 1 was repeated except that the type of complex added to the micropulverizing system was varied in each run and a pulverizing assistant was used in some of the runs. The results were as shown in Table 3 below. The various complexes employed were synthesized by reacting aluminum chloride with somewhat greater than the stoichiometrical amount of electron donor, in entirely the same manner as the synthesis of the aluminum chloride-diphenyl ether complex in Example 1.

Table 3

| | Treatment of TiCl₃ Catalytic Component | | | | Polypropylene | | |
|---|---|---|---|---|---|---|---|
| | Pulverizing Condition | | | Chlorobenzene Extraction (hr.) | Total Polymer Yield (g) | Crystallinity of Total Polymer (%) | Bulk Density of Solid Polymer |
| | TiCl₃A (g) | Complex (g) | Dimethyl Polysiloxane (g) | | | | |
| Ex. 7 | 60 | AlCl₃ · (C₂H₅)₂O | (6.2) | — | 24 | 140.6 | 93.2 | 0.363 |
| Ex. 8 | " | " | | 6 | " | 196.7 | 94.7 | 0.365 |
| Ex. 9 | " | AlCl₃ · ⟨○⟩—OCH₃ | (7.2) | — | " | 146.0 | 95.1 | 0.355 |
| Comp. Ex. 7 | " | " | | — | — | 90.5 | 88.5 | 0.347 |
| Ex. 10 | " | " | | 6 | 24 | 228.6 | 94.5 | 0.381 |
| Ex. 11 | " | AlCl₃ · ⟨○⟩—C(=O)—CH₃ | (7.6) | — | " | 163.1 | 92.0 | 0.344 |
| Ex. 12 | " | " | | 6 | " | 196.4 | 93.1 | 0.350 |
| Ex. 13 | " | AlCl₃ · ⟨○⟩—C(=O)—⟨○⟩ | (9.5) | — | " | 148.1 | 96.1 | 0.363 |
| Ex. 14 | " | " | | 6 | " | 209.7 | 96.3 | 0.381 |
| Ex. 15 | " | AlCl₃ · ⟨○⟩—C(=O)—OCH₃ | (8.1) | — | " | 151.6 | 94.2 | 0.344 |

Table 3-continued

| | Treatment of TiCl₃ Catalytic Component | | | | Polypropylene | | |
|---|---|---|---|---|---|---|---|
| | Pulverizing Condition | | | Chlorobenzene Extraction (hr.) | Total Polymer Yield (g) | Crystallinity of Total Polymer (%) | Bulk Density of Solid Polymer |
| | TiCl₃A (g) | Complex (g) | Dimethyl Polysiloxane (g) | | | | |
| Ex. 16 | " | " | 6 | " | 186.7 | 95.5 | 0.371 |
| Ex. 17 | " | AlCl₃·(C₂H₅)₃H | (7.0) | " | " | 171.1 | 95.9 | 0.378 |
| Ex. 18 | " | " | (14.0) | " | " | 136.1 | 96.8 | 0.373 |
| Ex. 19 | " | AlCl₃·⟨○⟩—H(CH₃)₂ | (7.6) | — | " | 146.0 | 95.4 | 0.345 |
| Ex. 20 | " | " | " | 6 | " | 181.6 | 96.4 | 0.373 |
| Ex. 21 | " | AlCl₃·(pyridine) | (6.4) | — | " | 149.9 | 95.2 | 0.343 |
| Ex. 22 | " | " | " | 6 | " | 184.1 | 96.1 | 0.380 |
| Ex. 23 | " | AlCl₃·[(CH₃)₂H]₃PO | (9.4) | — | " | 127.1 | 96.2 | 0.361 |
| Ex. 24 | " | " | " | 6 | " | 143.8 | 96.5 | 0.370 |
| Ex. 25 | " | AlCl₃·(C₆H₅)₃·P | (11.9) | — | " | 149.8 | 95.6 | 0.366 |
| Ex. 26 | " | " | " | 6 | " | 159.7 | 96.6 | 0.373 |
| Ex. 27 | " | AlCl₃·CH₃COO·n-C₄H₉ | (3.8) | — | " | 130.8 | 94.3 | 0.368 |
| Ex. 28 | " | " | " | 6 | " | 153.5 | 94.5 | 0.385 |
| Ex. 29 | " | AlCl₃·C₂H₅COCH₃ | (5.9) | — | " | 120.2 | 93.5 | 0.357 |
| Ex. 30 | " | " | " | 6 | " | 135.1 | 94.0 | 0.36 |
| Ex. 31 | " | AlCl₃(n-C₄H₉)₃P | (10.1) | — | " | 129.5 | 95.5 | 0.391 |
| Ex. 32 | " | " | " | 6 | " | 163.6 | 96.7 | 0.383 |
| Ex. 33 | " | AlCl₃(n-C₄H₉O)₃P | (5.8) | — | " | 101.3 | 94.3 | 0.359 |
| Ex. 34 | " | " | " | 6 | " | 128.7 | 95.0 | 0.360 |

EXAMPLES 35 AND 36

The results of repeating Example 2, except that the dimethyl polysiloxane added to the micropulverizing system of TiCl₃A and aluminum chloride-diphenyl ether complex was replaced by other pulverizing assistants, are given in Table 4 below.

Table 4

| | Treatment of TiCl₃ Catalytic Component | | | | Polypropylene | | |
|---|---|---|---|---|---|---|---|
| | Pulverizing Conditions | | | Chlorobenzene Extraction (hr.) | Total Polymer Yield (g) | Crystallinity of Total Polymer (g) | Bulk Density of Solid Polymer |
| | TiCl₃A (g) | Complex (g) | Pulverizing Assistant (g) | | | | |
| Ex. 35 | 60 | AlCl₃·⟨○⟩—O—⟨○⟩ (9.1) | 1,3-Dichlorotetramethyl disiloxane (6.0) | 24 | 182.6 | 95.5 | 0.373 |
| Ex. 36 | 60 | " | Octamethyl cyclotetrasiloxane (6.0) | " | 194.5 | 95.9 | 0.378 |

EXAMPLE 37 AND COMPARATIVE EXAMPLE 8

A sealed glass ampule containing 0.2 g of the same titanium trichloride component employed in the polymerization of Example 2 was set in a 2-liters capacity autoclave, in such a manner that it should be broken upon rotation of the stirring rod attached to the autoclave so that the titanium trichloride component should scatter about in the autoclave. The atmosphere in the autoclave was thoroughly nitrogen-substituted, and then gaseous propylene was blown thereinto to further substitute the nitrogen with propylene. Then 600 g of liquid propylene and 7.5 mmols of diethylaluminum chloride were introduced into the system under elevated pressure, and subsequently 2.2 liters of hydrogen was introduced. The system temperature was raised to 50° C., and the stirring rod was activated to break the ampule of titanium trichloride component. Then the polymerization reaction was continued for 4.0 hours at 50° C. Subsequently unreacted propylene was removed by flashing, methanol was added to decompose the catalyst, and the residue was dried under reduced pressure to provide 403.6 g of powdery polymer which had a crystallinity of 95.1% as determined by n-heptane-extraction.

When the foregoing procedures were repeated except that the titanium trichloride component was replaced by TiCl$_3$AA (Comparative Example 8) the total polymer yield was 163 g, and the crystallinity of total polymer was 90.1%.

EXAMPLE 38

Example 37 was repeated except that the amount of titanium trichloride component was reduced to 0.014 g, polymerization temperature was raised to 80° C., and the polymerization time, extended to 8 hours. Thus 238.2 g of solid polypropylene of 85.9% in crystallinity were obtained.

EXAMPLE 39

A 5-liters capacity four neck flask equipped with a stirring rod, thermometer, nitrogen inlet and an exhaust gas outlet, was charged with 3.8 liters of refined kerosene and 120 g of potassium fluorotitanate, and its inside atmosphere was thoroughly nitrogen-substituted under stirring. Then 254 g of ethylaluminum dichloride were added to the system, and reacted at 60° C. for 6 hours. The stirring was stopped, and the system was allowed to stand until it cooled off to room temperature. The aluminum concentration in the separated supernatant liquid was 0.237 mol/liter.

Ten (10) mmols of organoaluminum component obtained and 2.00 g of the titanium trichloride component obtained in Example 2 were used in the propylene polymerization under the same conditions as Example 2, and 222.2 g of polymer were obtained. The product had a crystallinity of 95.4%, and the bulk density of solid polymer was 0.388.

EXAMPLE 40 AND COMPARATIVE EXAMPLE 9

The same polymerization vessel as employed in Example 1 was charged with 500 ml of refined kerosene, and its inside atmosphere was thoroughly nitrogen-substituted. Then 2.00 g of the titanium trichloride component synthesized in Example 2 and 20 mmols of diethylaluminum chloride were added into the vessel. The system temperature was raised to 40° C., under stirring, and 70 ml of 4-methyl-1-pentene were dropped into the system, which required approximately 10 minutes. The polymerization was effected for the following a hour, at 40° C. Through the post-treatments as practiced in Example 1, 28 g of the polymer of 90.8% in crystallinity were obtained.

For comparison, 4-methyl-1-pentene was polymerized under identical conditions except that TiCl$_3$AA was used as the titanium trichloride component. The polymer yield in that case was 15 g, and the crystallinity of the polymer was 85.6%.

EXAMPLE 41

The same type of reactor employed in Example 1 for the synthesis of aluminum chloride-diphenyl ether complex was charged with 500 ml of benzene, and its inside atmosphere was thoroughly nitrogen-substituted. Into the reactor 80.0 g of sublimation-refined powdery aluminum bromide was added, and 61.3 g of diphenyl ether were gradually added thereto under stirring. Through the subsequent procedures similar to those practiced in Example 1, 124.5 g of crystalline solid were obtained.

Sixty (60) g of TiCl$_3$, 13.1 g of above reaction product, and 6 g of dimethyl polysiloxane were added to the same type of stainless steel vessel employed for the pulverizing step in Example 1, and micropulverized with a vibration mill for 5 hours. Thus pulverized product was hot-extracted with chlorobenzene for 24 hours, and dried at room temperature.

Using 2.00 g of the titanium trichloride component obtained and 10 mmols of diethylaluminum chloride, propylene was polymerized at 70° C. for 2 hours, similarly to Example 2. The resulting polymer yield was 175.3 g, and the product's crystallinity was 95.1%.

COMPARATIVE EXAMPLE 10

A quartz tube horizontally mounted on a small size electric oven was charged with 50 g of sponge-like metallic titanium, which was heated to 800° C. in a gaseous current of argon. When vaporized titanium tetrachloride was fed into the quartz tube from one end, black, fine particles jetted out from the other end, which were immediately contacted with a circulated flow of vaporized titanium tetrachloride, and the resulting purplish red fine particles were caught into a receiver together with the downflow of titanium tetrachloride. After the reaction, the greatest part of the titanium tetrachloride in the receiver was distilled off, and the remnant was dried at 200° C. under reduced pressure. Thus 122 g of titanium-reduced titanium trichloride were obtained (which will be hereinafter referred to as TiCl$_3$TR).

Twenty-five (25) g of this TiCl$_3$TR were added to a 800-ml capacity cylindrical stainless steel vessel in a nitrogen atmosphere. Further the vessel was filled with 100 stainless steel balls each of 16 mm in diameter, sealed, and its content was subjected to a pulverizing treatment by the ball mill, at 140 rpm for 24 hours.

The same type of polymerization vessel as employed in Example 1 was charged with 0.5 liter of refined kerosene, and its inside atmosphere was thoroughly nitrogen-substituted. Into the vessel 2.00 g of the pulverized TiCl$_3$TR (which will be hereinafter abbreviated as TiCl$_3$TRA) and 10 mmols of diethylaluminum chloride were then added, and gaseous propylene was blown thereinto at 70° C., to be polymerized for 2 hours. Through the subsequent post-treatments similar to those practiced in Example 1, 54.7 g of solid polymer having a crystallinity of 94.1% and bulk density of 0.237, and 9.1 g of kerosene-soluble polymer, were obtained. Therefore, the total polymer yield was 63.8 g, and the crystallinity of total polymer was 80.5%.

EXAMPLE 42

The same type of stainless steel vessel as employed in Comparative Example 10 was charged with 25 g of TiCl$_3$TR and 3.9 g of aluminum chloride-anisole complex (melting point: 74° C.), and the content was pulverized with ball mill for 24 hours under identical conditions with those employed in Comparative Example 10. Then a part of the pulverized product was transferred into a Soxhet's extractor equipped with glass filter, hot-extracted with chlorobenzene for 24 hours in a nitrogen atmosphere, and dried at reduced pressure and room temperature.

Two (2.00) g of thus obtained titanium trichloride component and 10 mmols of diethylaluminum chloride were used for propylene polymerization at 70° C. for 2 hours, yielding 119.5 g of solid polymer having a crystallinity of 96.5% and bulk density of 0.355, and 3.0 g of kerosene-soluble polymer. Thus the total polymer yield was 122.5 g, and the crystallinity of total polymer was 94.1%.

COMPARATIVE EXAMPLE 11

Under the identical conditions as of Example 42, 2.00 g of the pulverized product of TiCl$_3$TR prepared in Example 42 and aluminum chloride-anisole complex, and 10 mmols of diethylaluminum chloride, were used in propylene polymerization for 2 hours. Thus 92.7 g of polymer were obtained, and the crystallinity of total polymer was 88.0%.

EXAMPLE 43

9.2 Grams of the pulverized product of TiCl$_3$TR and aluminum chloride-anisole complex as obtained in Example 42 were placed in the same type of vessel as employed for washing with toluene-anisole mixed solvent in Example 3, and contacted therein with 200 ml of toluene containing 2.7 g of anisole under stirring, at 70° C. for 2 hours. Immediately thereafter the product was filtered through the glass filter, washed with toluene several times, and dried at room temperature.

Using 2.00 g of titanium trichloride component obtained and 10 mmols of diethyl aluminum chloride, propylene was polymerized at 70° C. for 2 hours. The total polymer yield was 125.7 g, and the crystallinity of total polymer was 90.2%.

EXAMPLES 44, 45, AND COMPARATIVE EXAMPLES 12 AND 13

Example 42 and Comparative Example 11 were repeated except that the amount of aluminum chloride-anisole complex added to the pulverizing system was varied for each run. The results were as given in Table 5, together with the results of Example 42 and Comparative Example 11.

Table 5

| | Treatment of TiCl Catalytic Component | | | Polypropylene | | |
|---|---|---|---|---|---|---|
| | Pulverizing Conditions | | Chlorobenzene Extraction (hr.) | Total Polymer Yield (g) | Crystallinity of Total Polymer (%) | Bulk Density of Solid Polymer |
| | TiCl$_3$TR (g) | Complex (g) | | | | |
| Ex. 42 | 25 | AlCl$_3$ · C$_6$H$_5$—OCH$_3$ (3.9) | 24 | 122.5 | 94.1 | 0.355 |
| Comp. Ex. 11 | " | " | " | — | 102.7 | 88.0 | 0.362 |
| Ex. 44 | " | " | (7.8) | 24 | 99.2 | 94.9 | 0.374 |
| Comp. Ex. 12 | " | " | " | — | 60.2 | 88.6 | 0.357 |
| Ex. 45 | " | " | (13.0) | 24 | 80.1 | 94.7 | 0.377 |
| Comp. Ex. 13 | " | " | " | — | 35.3 | 89.3 | 0.321 |

EXAMPLES 46–51, AND COMPARATIVE EXAMPLES 14–19

Example 42 and Comparative Example 11 were repeated, except that the type of complex added during the pulverizing step was varied for each run. The results were as given in Table 6.

Table 6

| | Treatment of TiCl$_3$ Catalytic Component | | | Polypropylene | | |
|---|---|---|---|---|---|---|
| | Pulverizing Conditions | | Chlorobenzene Extraction (hr.) | Total Polymer Yield (g) | Crystallinity of Total Polymer (g) | Bulk Density of Solid Polymer |
| | TiCl$_3$TR (g) | Complex (g) | | | | |
| Ex. 46 | 25 | AlCl$_3$ · (C$_2$H$_5$)$_2$O | 24 | 88.7 | 94.7 | 0.380 |
| Comp. Ex. 14 | " | " | — | 109.8 | 88.4 | 0.347 |
| Ex. 47 | " | AlCl$_3$ · C$_6$H$_5$—O—C$_6$H$_5$ | 24 | 120.3 | 94.8 | 0.359 |
| Comp. Ex. 15 | " | " | — | 101.5 | 88.7 | 0.335 |
| Ex. 48 | " | AlCl$_3$ · C$_6$H$_5$—C(=O)—C$_6$H$_5$ | 24 | 117.2 | 95.1 | 0.360 |
| Comp. Ex. 16 | " | " | — | 98.5 | 89.2 | 0.342 |
| Ex. 49 | " | AlCl$_3$ · C$_6$H$_5$—C(=O)—OCH$_3$ | 24 | 107.0 | 94.5 | 0.377 |
| Comp. Ex. 17 | " | " | — | 95.1 | 89.0 | 0.343 |

Table 6-continued

| | Treatment of TiCl₃ Catalytic Component | | | Polypropylene | | |
|---|---|---|---|---|---|---|
| | Pulverizing Conditions | | Chlorobenzene Extraction (hr.) | Total Polymer Yield (g) | Crystallinity of Total Polymer (g) | Bulk Density of Solid Polymer |
| | TiCl₃TR (g) | Complex (g) | | | | |
| Ex. 50 | " | 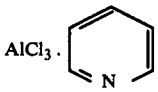 AlCl₃ · (pyridine complex) | 24 | 120.0 | 95.0 | 0.367 |
| Comp. Ex. 18 | " | " | — | 87.2 | 90.2 | 0.355 |
| Ex. 51 | " | AlCl₃ · [(CH₃)₂H]₃PO | 24 | 77.5 | 94.9 | 0.373 |
| Comp. Ex. 19 | " | " | — | 59.2 | 92.8 | 0.341 |

EXAMPLES 52-58

Example 2 was repeated by varying the kinds of the extracting solvent and the organic polar compounds as indicated in Table 7 to obtain the results shown in Table 7.

Table 7

| Example No. | Extracting Solvent Kind | Amount Used (ml) | Organic Polar Compound Kind | Amount Used (g) | Polypropylene Yield (g) | Crystallinity (%) | Bulk Density (g/cm) |
|---|---|---|---|---|---|---|---|
| 52 | heptane | 300 | anisole | 6.4* | 136.3 | 90.2 | 0.311 |
| 53 | benzene | 300 | anisole | 6.4* | 177.0 | 92.0 | 0.335 |
| 54 | toluene | 300 | methyl ethyl ketone | 1.1 | 131.8 | 91.0 | 0.355 |
| 55 | toluene | 300 | benzophenone | 3.8 | 170.4 | 92.3 | 0.357 |
| 56 | toluene | 300 | n-butyl acetate | 4.8 | 129.5 | 91.9 | 0.343 |
| 57 | toluene | 300 | quinoline | 1.3 | 162.1 | 92.7 | 0.351 |
| 58 | toluene | 300 | dimethyl** polysiloxane | 4.8 | 169.9 | 89.5 | 0.276 |

Notes:
*amount in milliliter
**having an average molecular weight of about 14,000

What we claim is:

1. A process for the polymerization of alpha-olefins which comprises,
polymerizing or copolymerizing one or more alpha-olefin monomers in the presence of a catalyst, said catalyst consisting essentially of:
(A) a titanium trichloride composition and
(B) an organoaluminum compound; said titanium trichloride composition (A) obtained by
(a) mechanically pulverizing
(i) a titanium trichloride component prepared by reduction of titanium tetrachloride with hydrogen, silicon, metallic titanium or metallic aluminum,
(ii) in the presence of a complex of aluminum chloride or aluminum bromide with an electron-donor in an amount of from 0.005 to 0.5 mol per mol of said titanium trichloride component (i), said electron-donor being selected from the group consisting of
(1) a nitrogen-containing organic compound selected from the group consisting of saturated aliphatic primary amines having 1-18 carbon atoms, saturated aliphatic secondary amines having 2-24 carbon atoms, saturated aliphatic tertiary amines having 3-18 carbon atoms, aromatic amines having 6-20 carbon atoms, and heterocyclic amines having 5-18 carbon atoms; and
(2) a phosphorus-containing organic compound selected from the group consisting of trialkyl phosphines having 3-21 carbon atoms, triaryl phosphines having 18-21 carbon atoms, trialkyl phosphites having 3-24 carbon atoms, triaryl phosphites having 18-24 carbon atoms, and hexaalkyl phosphoramides having 1-4 carbon atoms in each alkyl group; and
(b) extracting the micro-pulverized titanium trichloride component with an extracting medium comprising a solvent selected from the group consisting of saturated aliphatic hydrocarbons having 3 to 20 carbon atoms, aromatic hydrocarbons having 6 to 20 carbon atoms and halogenated aromatic hydrocarbons having 6 to 16 carbon atoms and 0.005-0.5 mol per mol of the micro-pulverized titanium trichloride component (i) to be extracted of a nitrogen-containing organic polar compound selected from the group consisting of saturated aliphatic secondary amines having 2 to 24 carbon atoms, saturated aliphatic tertiary amines having 3-18 carbon atoms, aromatic amines having 6-20 carbon atoms, heterocyclic amines having 5-18 carbon atoms, aromatic monoisocyanates having 7-11 carbon atoms and aromatic azo compounds having 12-20 carbon atoms which may have a hydrocarbon group or halogen atoms as a substituent.

2. The process of claim 1 wherein the solvent is used in an amount of 1-100 parts by weight per part by weight of the micro-pulverized titanium trichloride component (i) to be extracted.

3. The process of claim 1, wherein said organoaluminum compound (B) is selected from the group consisting of trialkylaluminum, dialkylaluminum halide, dialkylaluminum alkoxide, alkylaluminum alkoxy halide, alkylaluminum dihalide, reaction products of these with electron-donor compounds, reaction products of these with alkali metal halides, and reaction products of these with alkali metal complex fluorides of transition metals.

4. The process of claim 1 wherein said one or more alpha-olefin monomers are selected from the group consisting of ethylene, propylene, 1-butene, 4-methyl-1-pentene and styrene; said nitrogen-containing organic compound (1) is selected from the group consisting of
(a) butylamine,
(b) diethylamine, dibutylamine,
(c) triethylamine,
(d) aniline, N-methylaniline, N,N-dimethylaniline, diphenylamine, triphenylamine,
(e) pyridine, 2-picoline, 3-picoline, quinoline and isoquinoline; and said phosphorus-containing organic compound (2) is selected from the group consisting of
(a) triphenylphosphine,
(b) trimethyl phosphite, triethyl phosphite, tributyl phosphite,
(c) triphenyl phosphite, and
(d) hexamethyl phosphorotriamide.

5. The process according to claim 4 wherein said electron-donor compound is a nitrogen-containing organic compound selected from the group consisting of triethylamine, dimethylaniline, triphenylamine, pyridine, and picoline.

6. The process according to claim 4 wherein said electron-donor compound is a phosphorus-containing organic compound selected from the group consisting of triphenylphosphine and hexamethyl phosphorotriamide.

7. The process of claim 4 wherein said solvent for extracting said micro-pulverized titanium trichloride component is selected from the group consisting of hexane, n-heptane, benzene, toluene, xylene, chlorobenzene and bromobenzene.

8. The process of claim 1 wherein the extracting medium contains, in addition to the extracting solvent, 0.005-0.5 mols per mol of the micro-pulverized titanium component to be extracted of a nitrogen-containing organic polar compound selected from the group consisting of pyridine, 2-chloropyridine, 2-picoline, quinoline, diethylamine, dibutylamine, N-methylaniline, diphenylamine, triethylamine, tributylamine, trihexylamine, N,N-dimethylamine, triphenylamine, phenyl isocyanate, toluyl isocyanate, azobenzene, azotoluene and benzonitrile.

9. The process of claim 1 wherein said electron-donor is a hexaalkyl phosphoramide having 1-4 carbon atoms in each alkyl group.

10. A catalyst composition consisting essentially of
(A) a titanium trichloride composition and
(B) an organoaluminum compound; said titanium trichloride composition (A) obtained by
(a) mechanically pulverizing
(i) a titanium trichloride component prepared by reduction of titanium tetrachloride with hydrogen, silicon, metallic titanium or metallic aluminum,
(ii) in the presence of a complex of aluminum chloride or aluminum bromide with an electron-donor in an amount of from 0.005 to 0.5 mol per mol of said titanium trichloride component (i), said electron-donor being selected from the group consisting of (1) a nitrogen-containing organic compound selected from the group consisting of saturated aliphatic primary amines having 1-18 carbon atoms, saturated aliphatic secondary amines having 2-24 carbon atoms, saturated aliphatic tertiary amines having 3-18 carbon atoms, aromatic amines having 6-20 carbon atoms, and heterocyclic amines having 5-18 carbon atoms; and
(2) a phosphorus-containing organic compound selected from the group consisting of trialkyl phosphines having 3-21 carbon atoms, triaryl phosphines having 18-21 carbon atoms, trialkyl phosphites having 3-24 carbon atoms, triaryl phosphites having 18-24 carbon atoms, and hexaalkyl phosphoramides having 1-4 carbon atoms in each alkyl group; and (b) extracting the micro-pulverized titanium trichloride component with an extracting medium comprising a solvent selected from the group consisting of saturated aliphatic hydrocarbons, having 3 to 20 carbon atoms, aromatic hydrocarbons having 6 to 20 carbon atoms and halogenated aromatic hydrocarbons having 6 to 16 carbon atoms and 0.005-0.5 mols per mol of the micro-pulverized titanium trichloride component (i) to be extracted of a nitrogen-containing organic polar compound selected from the group consisting of saturated aliphatic secondary amines having 2-24 carbon atoms, saturated aliphatic tertiary amines having 3-18 carbon atoms, aromatic amines having 6-20 carbon atoms, heterocyclic amines having 5-18 carbon atoms, aromatic monoisocyanates having 7-11 carbon atoms and aromatic azo compounds having 12-20 carbon atoms which may have a hydrocarbon group or halogen atom as a substituent.

11. The composition of claim 10, wherein the solvent is used in an amount of 1-100 parts by weight per part by weight of the micro-pulverized titanium trichloride component (i) to be extracted.

12. The catalyst composition of claim 10, wherein said organoaluminum compound (B) is selected from the group consisting of trialkylaluminum, dialkylaluminum halide, dialkylaluminum alkoxide, alkylaluminum alkoxy halide, alkylaluminum dihalide, reaction products of these with electron-donor compounds, reaction products of these with alkali metal halides, and reaction products of these with alkali metal complex fluorides of transition metals.

13. The catalyst composition of claim 10, wherein said nitrogen-containing organic compound (1) is selected from the group consisting of
(a) butylamine,
(b) diethylamine, dibutylamine,
(c) triethylamine,
(d) aniline, N-methylaniline, N,N-dimethylaniline, diphenylamine, triphenylamine,
(e) pyridine, 2-picoline, 3-picoline, quinoline and isoquinoline; and said phosphorus-containing organic compound (2) is selected from the group consisting of
(a) triphenylphosphine,
(b) trimethyl phosphite, triethyl phosphite, tributyl phosphite,
(c) triphenyl phosphite, and
(d) hexamethyl phosphorotriamide.

14. The catalyst composition of claim 13, wherein said electron-donor compound is a nitrogen-containing organic compound selected from the group consisting of triethylamine, dimethylaniline, triphenylamine, pyridine, and picoline.

15. The catalyst composition of claim 13 wherein said electron-donor compound is a phosphorus-containing organic compound selected from the group consisting of triphenylphosphine and hexamethyl phosphorotriamide.

16. The catalyst composition of claim 13 wherein said solvent for extracting said micro-pulverized titanium trichloride component is selected from the group consisting of hexane, n-heptane, benzene, toluene, xylene, chlorobenzene and bromobenzene.

17. The catalyst composition of claim 10 wherein the solvent is used in an amount of 1-100 parts by weight per part by weight of the micro-pulverized titanium trichloride component to be extracted.

18. The catalyst composition of claim 17 wherein the extracting medium contains, in addition to the extracting solvent, 0.005-0.5 mols per mol of the micro-pulverized titanium component to be extracted of a nitrogen-containing organic polar compound selected from the group consisting of pyridine, 2-chloropyridine, 2-picoline, quinoline, diethylamine, dibutylamine, N-methylaniline, diphenylamine, triethylamine, tributylamine, trihexylamine, N,N-dimethylamine, triphenylamine, phenyl isocyanate, toluyl isocyanate, azobenzene, azotoluene and benzonitrile.

19. The catalyst composition of claim 10 wherein said electron-donor is a hexaalkyl phosphoramide having 1-4 carbon atoms in each alkyl group.

20. A process for the polymerization of alpha-olefins which comprises,
polymerizing or copolymerizing one or more alpha-olefin monomers in the presence of a catalyst, said catalyst consisting essentially of:
(A) a titanium trichloride composition and
(B) an organoaluminum compound; said titanium trichloride composition (A) obtained by
(a) mechanically pulverizing
  (i) a titanium trichloride component prepared by reduction of titanium tetrachloride with hydrogen, silicon, metallic titanium or metallic aluminum,
  (ii) in the presence of a complex of aluminum chloride or aluminum bromide with an electron-donor in an amount of from 0.005 to 0.5 mol per mol of said titanium trichloride component (i), said electron-donor being selected from the group consisting of
    (1) a nitrogen-containing organic compound selected from the group consisting of saturated aliphatic primary amines having 1-18 carbon atoms, saturated aliphatic secondary amines having 2-24 carbon atoms, saturated aliphatic tertiary amines having 3-18 carbon atoms, aromatic amines having 6-20 carbon atoms, and heterocyclic amines having 5-18 carbon atoms; and
    (2) a phosphorus-containing organic compound selected from the group consisting of trialkyl phosphines having 3-21 carbon atoms, triaryl phosphines having 18-21 carbon atoms, trialkyl phosphites having 3-24 carbon atoms, triaryl phosphites having 18-24 carbon atoms, and hexaalkyl phosphoramides having 1-4 carbon atoms in each alkyl group; and (b) extracting the micro-pulverized titanium trichloride component with an extracting medium comprising a solvent selected from the group consisting of saturated aliphatic hydrocarbons having 3 to 20 carbon atoms, aromatic hydrocarbons having 6 to 20 carbon atoms and halogenated aromatic hydrocarbons having 6 to 16 carbon atoms and 0.005-10.0 mols per mol of the micro-pulverized titanium trichloride component (i) to be extracted of an oxygen-containing organic polar compound selected from the group consisting of saturated aliphatic monoethers of 2-32 carbon atoms having an alkyl group, aliphatic ethers of 3-20 carbon atoms having an unsaturated aliphatic hydrocarbon group, aromatic ethers of 7-16 carbon atoms having a saturated alkyl group or aryl group, mono- or diethers having a halogen-substantial aromatic group of 7-16 carbon atoms, saturated alkyl esters of saturated aliphatic monocarboxylic acids having an aliphatic monocarboxylic acid residual group of 1-21 carbon atoms and a saturated alkyl group of 1-16 carbon atoms, unsaturated alkyl esters of saturated aliphatic monocarboxylic acids having a saturated aliphatic monocarboxylic acid residual group of 1-8 carbon atoms and an unsaturated alkyl group of 2-12 carbon atoms, alkyl esters of unsaturated aliphatic monocarboxylic acids having an unsaturated aliphatic monocarboxylic acid residual group having 2-12 carbon atoms and a saturated or unsaturated alkyl group of 1-10 carbon atoms, saturated alkyl esters of aromatic monocarboxylic acids having an aromatic monocarboxylic acid residual group of 7-18 carbon atoms and a saturated alkyl group of 1-20 carbon atoms, saturated aliphatic monoalcohols having 1-18 carbon atoms, monohydric and dihydric phenols having 6-16 carbon atoms, saturated aliphatic monoketones having 3-20 carbon atoms, saturated aliphatic diketones having 4-12 carbon atoms, aromatic monoketones having 7-18 carbon atoms, aromatic monocarboxylic acids having 7-18 carbon atoms, saturated aliphatic monocarboxylic acids having 1-20 carbon atoms, saturated aliphatic carboxylic acid halides having 2-12 carbon atoms and aromatic carboxylic acid halides having 7-15 carbon atoms.

21. The process of claim 20 wherein the extracting medium contains, in addition to the extracting solvent, 0.005-10.0 mols per mol of the micro-pulverized titanium trichloride component to be extracted of an oxygen-containing organic polar compound selected from the group consisting of dimethyl ether, diethyl ether, n-butyl ether, isopropyl ether, ethyl butyl ether, octyl ether, anisole, phenetole, diphenyl ether, chloroanisole, acetone, methyl ethyl ketone, methyl isobutyl ketone, acetophenone, benzophenone, acetylacetone, allyl acetate, butyl acetate, butyl formate, ethyl acetate, ethyl laurate, methyl benzoate, butyl aldehyde, benaldehyde, ethanol, propanol, sec-butanol, acetic acid, acetic acid chloride, benzoic acid chloride and cresol.

22. A process for the polymerization of alpha-olefins which comprises,
polymerizing or copolymerizing one or more alpha-olefin monomers in the presence of a catalyst, said catalyst consisting essentially of:
(A) a titanium trichloride composition and
(B) an organoaluminum compound; said titanium trichloride composition (A) obtained by
(a) mechanically pulverizing (i) a titanium trichloride component prepared by reduction of titanium tetrachloride with hydrogen, silicon, metallic titanium or metallic aluminum, (ii) in the presence of a complex of aluminum chloride or aluminum bromide with an electron-donor in an amount of from 0.005 to 0.5 mol per mol of said titanium trichloride component (i), said electron-donor being selected from the group consisting of (1) a nitrogen-containing organic compound selected from the group consisting of saturated aliphatic primary amines having 1–18 carbon atoms, saturated aliphatic secondary amines having 2–24 carbon atoms, saturated aliphatic tertiary amines having 3–18 carbon atoms, aromatic amines having 6–20 carbon atoms, and heterocyclic amines having 5–18 carbon atoms; and (2) a phosphorus-containing organic compound selected from the group consisting of trialkyl phosphines having 3–21 carbon atoms, triaryl phosphines having 18–21 carbon atoms, trialkyl phosphites having 3–24 carbon atoms, triaryl phosphites having 18–24 carbon atoms, and hexaalkyl phosphoramides having 1–4 carbon atoms in each alkyl group; and (b) extracting the micro-pulverized titanium trichloride component with an extracting medium comprising a solvent selected from the group consisting of saturated aliphatic hydrocarbons having 3 to 20 carbon atoms, aromatic hydrocarbons having 6 to 20 carbon atoms and halogenated aromatic hydrocarbons having 6 to 16 carbon atoms and 0.01–15 parts by weight per part by weight of the micro-pulverized titanium trichloride component (i) to be extracted of a silicon-containing organic polar compound selected from the group consisting of tetrahydrocarbylsilanes of 4–50 carbon atoms having a substituent selected from a saturated alkyl group and an aryl group, tetrahydrocarbylsilanes of 5–28 carbon atoms having an unsaturated alkyl group, alkyl hydrogenosilanes of 1–30 carbon atoms having an Si—H bond, aryl hydrogenolsilanes of up to 30 carbon atoms having an Si—H bond, alkyl halogenosilanes of 3–30 carbon atoms having an Si-halogen bond, aryl halogenosilanes of 6—30 carbon atoms having an Si-halogen bond, trialkylsilyl amines of 3–18 carbon atoms, triaryl silyl amines of up to 30 carbon atoms, alkoxysilanes of 4–20 carbon atoms having an Si-O-C bond, aryloxy silanes of 6–40 carbon atoms having an Si-O-C bond, alkyl silyl esters or aryl esters of aliphatic mono- or aromatic monocarboxylic acids composed of trialkyl silanols having 3–10 carbon atoms, alkylarly silanols having 8–20 carbon atoms or triarylsilanols having 18–30 carbon atoms and aliphatic monocarboxylic acids having 1–10 carbon atoms or aromatic monocarboxylic acids having 7–11 carbon atoms, trialkyl silicon isocyanates having 3–10 carbon atoms, dialkyl aryl silicon isocyanates having 8–15 carbon atoms, triaryl silicon isocyanates having 18–30 carbon atoms, polysilmethylenes of the formula $CH_3SiCH_2[(CH_3)_2SiCH_2]_xSi(CH_3)_3$, wherein x is an integer of 1–10, linear polyalkyl polysilanes having 6–80 carbon atoms, polyaryl polysilanes of up to 80 carbon atoms, polyalkyl cyclopolysilanes having 12–120 carbon atoms, organopolysiloxanes of the formula $R(R'R''SiO)_xSiR_3$, wherein R, R' and R'' which may be the same or different, represent an alkyl group having 1–4 carbon atoms, an aryl group having 6–8 carbon atoms, with the proviso that R'' can also be hydrogen, and x is an integer of 1–1000; $\alpha,\omega$-dihaloalkylpolysiloxanes of the formula $X(R_2SiO)_xSiR_2X$, wherein R and x are as defined above, and X is a halogen atom; alkyl cyclopolysiloxanes of the formula $(R'''HSiO)_y$, wherein R''' is an alkyl group having 1–4 carbon atoms, and y is an integer of 3–8, alkyl cyclopolysiloxanes of the general formula $(R''''_2SiO)_z$, wherein R'''' is an alkyl group having 1–4 carbon atoms and z is an integer of 3–9, aryl cyclopolysiloxanes of the formula $(Q_2SiO)_p$, wherein Q is an aryl group having 6–8 carbon atoms and p is an integer of 3–6, alkyl polysilzanes of 6–50 carbon atoms having an Si-N-Si bond and a molecular weight of not more than 1000, and aryl polysilazanes of 6–50 carbon atoms having an Si-N-Si bond and a molecular weight of not more than 1000.

23. The process of claim 22 wherein the extracting medium contains, in addition to the extracting solvent, 0.02–4 10.0 parts by weight per part by weight of the micro-pulverized titanium component to be extracted of a silicon-containing organic polar compound selected from the group consisting of dichlorodimethylsilane, phenyltrichlorosilane, diphenyldichlorosilane, triphenylchlorosilane, tetramethylsilane, tetraphenylsilane, diethyl diethoxysilane, trimethylvinylsilane, hexamethyldisilane, hexaphenyldisilane, dodecamethylcyclohexasilane, hexamethyldisilmethylene, triethylacetoxysilane, trimethyl silicon isocyanate, and triphenyl isocyanate silane.

24. A catalyst composition consisting essentially of
(A) a titanium trichloride composition and
(B) an organoaluminum compound; said titanium trichloride composition (A) obtained by
(a) mechanically pulverizing
  (i) a titanium trichloride component prepared by reduction of titanium tetrachloride with hydrogen, silicon, metallic titanium or metallic aluminum,
  (ii) in the presence of a complex of aluminum chloride or aluminum bromide with an electron-donor in an amount of from 0.005 to 0.5 mol per mol of said titanium trichloride component (i), said electron-donor being selected from the group consisting of
    (1) a nitrogen-containing organic compound selected from the group consisting of saturated aliphatic primary amines having 1–18 carbon atoms, saturated aliphatic secondary amines having 2–24 carbon atoms, saturated aliphatic tertiary amines having 3–18 carbon atoms, aromatic amines having 6–20 carbon atoms, and heterocyclic amines having 5–18 carbon atoms; and
    (2) a phosphorus-containing organic compound selected from the group consisting of trialkyl phosphines having 3–21 carbon atoms, triaryl phosphines having 18–21 carbon atoms, trialkyl phosphites having 3–24 carbon atoms, triaryl phosphites having 18–24 carbon atoms, and hexaalkyl phosphoramides having 1–4 carbon atoms in each alkyl group; and (b) extracting the micro-pulverized titanium trichloride component with an extracting medium comprising a solvent selected from the group consisting of saturated aliphatic hydrocarbons having 3 to 20 carbon atoms, aromatic hydrocarbons having 6 to 20 carbon atoms and halogenated aromatic hydrocarbons having 6 to 16 carbon atoms and 0.005-10.0 mols per mol of the micro-pulverized titanium trichloride component (i) to be extracted of an oxygen-containing organic polar compound selected from the group consisting of saturated aliphatic monoethers of 2-32 carbon atoms having an alkyl group, aliphatic ethers of 3-20 carbon atoms having an unsaturated aliphatic hydrocarbon group, aromatic ethers of 7-16 carbon atoms having a saturated alkyl group or aryl group, mono- or diethers having a halogen-substituted aromatic group of 7-16 carbon atoms, saturated alkyl esters of saturated aliphatic monocarboxylic acids having an aliphatic monocarboxylic acid residual group of 1-21 carbon atoms and a saturated alkyl group of 1-16 carbon atoms, unsaturated alkyl esters of saturated aliphatic monocarboxylic acids having a saturated aliphatic monocarboxylic acid residual group of 1-8 carbon atoms and an unsaturated alkyl group of 2-12 carbon atoms, alkyl esters of unsaturated aliphatic monocarboxylic acids having an unsaturated aliphatic monocarboxylic acid residual group having 2-12 carbon atoms and a saturated or unsaturated alkyl group of 1-10 carbon atoms, saturated alkyl esters of aromatic monocarboxylic acids having an aromatic monocarboxylic acid residual group of 7-18 carbon atoms and a saturated alkyl group of 1-20 carbon atoms, saturated aliphatic monoalohols having 1-18 carbon atoms, monohydric and dihydric phenols having 6-16 carbon atoms, saturated aliphatic monoketones having 3-20 carbon atoms, saturated aliphatic diketones having 4-12 carbon atoms, aromatic monoketones having 7-18 carbon atoms, aromatic monocarboxylic acids having 7-18 carbon atoms, saturated aliphatic monocarboxylic acids having 1-20 carbon atoms, saturated aliphatic carboxylic acid halides having 2-12 carbon atoms and aromatic carboxylic acid halides having 7-15 carbon atoms.

25. The catalyst composition of claim 24, wherein the extracting medium contains, in addition to the extracting solvent, 0.005-10.0 mols per mol of the micro-pulverized titanium trichloride component to be extracted of an oxygen-containing polar compound selected from the group consisting of dimethyl ether, diethyl ether, n-butyl ether, isopropyl ether, ethyl butyl ether, octyl ether, anisole, phenetole, diphenyl ether, chloroanisole, acetone, methyl ethyl ketone, methyl isobutyl ketone, acetophenone, benaophenone, acetylacetone, allyl acetate, butyl acetate, butyl formate, ethyl acetate, ethyl laurate, methyl benzoate, butyl aldehyde, benzaldehyde, ethanol, propanol, sec-butanol, acetic acid, acetic acid chloride, benzoic acid chloride and cresol.

26. A catalyst composition consisting essentially of
(A) a titanium trichloride composition and
(B) an organoaluminum compound; said titanium trichloride composition (A) obtained by
(a) mechanically pulverizing
(i) a titanium trichloride component prepared by reduction of titanium tetrachloride with hydrogen, silicon, metallic titanium or metallic aluminum,
(ii) in the presence of a complex of aluminum chloride or aluminum bromide with an electron-donor in an amount of from 0.005 to 0.5 mol per mol of said titanium trichloride component (i), said electron-donor being selected from the group consisting of
(1) a nitrogen-containing organic compound selected from the group consisting of saturated aliphatic primary amines having 1-18 carbon atoms, saturated aliphatic secondary amines having 2-24 carbon atoms, saturated aliphatic tertiary amines having 3-18 carbon atoms, aromatic amines having 6-20 carbon atoms, and heterocyclic amines having 5-18 carbon toms; and
(2) a phosphorus-containing organic compound selected from the group consisting of trialkyl phosphines having 3-21 carbon atoms, triaryl phosphines having 18-21 carbon atoms, trialkyl phosphites having 3-24 carbon atoms, triaryl phosphites having 18-24 carbon atoms, and hexaalkyl phosphoramides having 1-4 carbon atoms in each alkyl group; and
(b) extracting the micro-pulverized titanium trichloride component with an extracting medium comprising a solvent selected from the group consisting of saturated aliphatic hydrocarbons having 3 to 20 carbon atoms, aromatic hydrocarbons having 6 to 20 carbon atoms and halogenated aromatic hydrocarbons having 6 to 16 carbon atoms and 0.01-15 parts by weight per part by weight per part by weight of the micro-pulverized titanium trichloride component (i) to be extracted of a silicon-containing organic polar compound selected from the group consisting of tetrahydrocarbylsilanes of 4-50 carbon atoms having a substituent selected from a saturated alkyl group and an aryl group, tetrahydrocarbylsilanes of 5-28 carbon atoms having an unsaturated alkyl group, alkyl hydrogenosilanes of 1-30 carbon atoms having an Si—H bond, aryl hydrogenosilanes of up to 30 carbon atoms having an Si—H bond, alkyl halogenosilanes of 3-30 carbon atoms having an Si-halogen bond, aryl halogenosilanes of 6-30 carbon atoms having an Si-halogen bond, trialkylsilyl amines of 3-18 carbon atoms, triaryl silyl amines of up to 30 carbon atoms, alkoxysilanes of 4-20 carbon atoms having an Si—O—C bond, aryloxy silanes of 6-40 carbon atoms having an Si—O—C bond, alkyl silyl esters of aryl silyl esters of aliphatic mono- or aromatic monocarboxylic acids composed of trialkyl silanols having 3-10 carbon atoms, alkylaryl silanols having 8-20 carbon atoms or triarylsilanols having 18-30 carbon atoms and aliphatic monocarboxylic acids having 1-10 carbon atoms or aromatic monocarboxylic acids having 7-11 carbon atoms, trialkyl silicon isocyanates having 3-10 carbon atoms, dialkyl aryl silicon isocyanates having 8-15 carbon atoms, triaryl silicon isocyanates having 18-30 carbon atoms, polysilmethylenes of the formula $CH_3SiCH_2[(CH_3)_2SiCH_2]_xSi(CH_3)_3$, wherein x is an integer of 1-10, linear polyalkyl polysilanes having 6-80 carbon atoms, polyaryl polysilanes of up to 80 carbon atoms, polyalkyl cyclopolysilanes having 12-120 carbon atoms, organopolysiloxanes of the formula $R(R'R''SiO)_xSiR_3$, wherein R, R' and R'' which may be the same or different, represent an alkyl group having 1-4 carbon atoms, an aryl group having 6-8 carbon atoms, with the proviso that R″ can also be hydrogen, and x is an integrer of 1–1000; α,ω-dihaloalkylpolysiloxanes of the formula X(R$_2$SiO)$_x$SiR$_2$X, wherein R and x are as defined above, and X is a halogen atom; alkyl cyclopolysiloxanes of the formula (R‴HSiO)$_y$, wherein R″ is an alkyl group having 1-4 carbon atoms, and y is an integer of 3-8, alkyl cyclopolysiloxanes of the general formula (R″″$_2$SiO)$_z$, wherein R″″ is an alkyl group having 1-4 carbon atoms and z is an integer of 3-9, aryl cyclopolysiloxanes of the formula (Q$_2$SiO)$_p$, wherein Q is an aryl group having 6-8 carbon atoms and p is an integer of 3-6, alkyl polysilazanes of 6-50 carbon atoms having an Si-N-Si bond and a molecular weight of not more than 1000, and aryl polysilazanes of 6-50 carbon atoms having an Si—N—Si bond and a molecular weight of not more than 1000.

27. The catalyst composition of claim 26, wherein the extracting medium contains, in addition to the extracting solvent, 0.02–10.0 parts by weight per part by weight of the micro-pulverized titanium component to be extracted of a silicon-containing organic polar compound selected from the group consisting of dichlorodimethylsilane, phenyltrichlorosilane, diphenyldichlorosilane, triphenylchlorosilane, tetramethylsilane, tetraphenylsilane, diethyl diethoxysilane, trimethylvinylsilane, hexamethyldisilane, hexaphenyldisilane, dodecamethylcyclohexasilane, hexamethyldisilmethylene, triethylacetoxysilane, trimethyl silicon isocyanate, and triphenyl isocyanate silane.

* * * * *

UNITED STATES PATENT AND TRADEMARK OFFICE
CERTIFICATE OF CORRECTION

PATENT NO. : 4,135,045
DATED : January 16, 1979
INVENTOR(S) : Norio Matsuzawa et al.

It is certified that error appears in the above-identified patent and that said Letters Patent are hereby corrected as shown below:

Claim 23, column 32, line 26, delete "0.02-4 10.0 parts", and insert -- 0.02-10.0 parts --

Signed and Sealed this

Eighth Day of May 1979

[SEAL]

Attest:

RUTH C. MASON
Attesting Officer

DONALD W. BANNER
Commissioner of Patents and Trademarks